(12) United States Patent
Turow et al.

(10) Patent No.: US 11,348,029 B1
(45) Date of Patent: May 31, 2022

(54) TRANSFORMATION OF MACHINE LEARNING MODELS FOR COMPUTING HUBS

(71) Applicant: Amazon Technologies, Inc., Seattle, WA (US)

(72) Inventors: Jonathan I. Turow, Seattle, WA (US); Calvin Yue-Ren Kuo, Mercer Island, WA (US); Jiazhen Chen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1117 days.

(21) Appl. No.: 15/821,515

(22) Filed: Nov. 22, 2017

(51) Int. Cl.
*G06N 20/00* (2019.01)

(52) U.S. Cl.
CPC ................... *G06N 20/00* (2019.01)

(58) Field of Classification Search
CPC ........ G06N 20/00; G06N 5/025; G06N 7/005; G06K 9/6256; G06K 9/6269
USPC .......................................................... 706/12
See application file for complete search history.

(56) References Cited

U.S. PATENT DOCUMENTS

| | | | | |
|---|---|---|---|---|
| 5,963,447 A * | 10/1999 | Kohn | ............... | G05B 19/41865 700/49 |
| 7,533,006 B2 * | 5/2009 | Huddleston | ............ | G06Q 10/10 703/2 |
| 7,562,059 B2 * | 7/2009 | Scarborough | ........ | G06Q 10/063 706/21 |
| 7,788,198 B2 * | 8/2010 | Liu | ..................... | G06F 11/3452 706/45 |
| 8,417,715 B1 * | 4/2013 | Bruckhaus | ......... | G06Q 30/0202 707/758 |
| 8,838,510 B2 * | 9/2014 | Baughman | ............. | G06N 3/126 706/13 |
| 9,134,398 B2 * | 9/2015 | Dupray | ................... | G01S 1/026 |
| 10,262,336 B2 * | 4/2019 | Gierach | ............. | G06Q 30/0201 |
| 10,452,839 B1 * | 10/2019 | Curtin | ..................... | G06F 21/55 |
| 10,565,329 B2 * | 2/2020 | Greenwood | ............ | G06F 17/00 |
| 10,581,675 B1 * | 3/2020 | Iyer | ........................... | G06F 8/71 |
| 10,686,869 B2 * | 6/2020 | Chilimbi | .............. | G06N 3/0454 |
| 10,860,950 B2 * | 12/2020 | Chu | ........................ | G06N 20/00 |

* cited by examiner

*Primary Examiner* — Viker A Lamardo
(74) *Attorney, Agent, or Firm* — Davis Wright Tremaine LLP

(57) ABSTRACT

Technology is described for providing machine learning (ML) models. A plurality of candidate ML models that are derived from a primary ML model may be generated in a service provider environment. The primary ML model may be associated with a set of parameters and a candidate ML model in the plurality of candidate ML models may be associated with a subset of the parameters associated with the primary ML model. The plurality of candidate ML models may be run against validation data to evaluate performance criteria for the candidate ML models. A performance representation of the candidate ML models with respect to performance results for the candidate ML models may be provided. An ML model may be selected from the performance representation based on the performance results for the candidate ML models.

20 Claims, 8 Drawing Sheets

TRANSFORMATION OF MACHINE LEARNING MODELS FOR COMPUTING HUBS

BACKGROUND

Machine learning (ML) may involve discovering patterns in input data, constructing ML models using discovered patterns in the input data, and using the ML models to make predictions on subsequently received data. A number of different types of ML models may be used to analyze and make predictions on received data, such as regression ML models, multiclass ML models or binary ML models.

In one example, building the ML model may involve determining an objective of the ML model (e.g., a type of prediction for the ML model) and collecting input data (e.g., labeled data) for generation of the ML model. Labeled data may include examples or observations, for which a target answer is already known. A portion of the labeled data may be used as training data to train the ML model. For example, the ML model may be trained using the training data to recognize patterns in input data. In addition, a portion of the labeled data may be used as evaluation data to evaluate a predictive quality of the ML model. For example, a predictive performance may be evaluated by comparing predictions on the evaluation data to true values.

In one example, building, testing and applying ML models may involve processing a relatively large input data set and tuning hundreds of ML model parameters, which may consume a relatively large amount of computing power. Therefore, ML is generally performed using dedicated processing hardware in a service provider environment.

DETAILED DESCRIPTION

Figure 1:
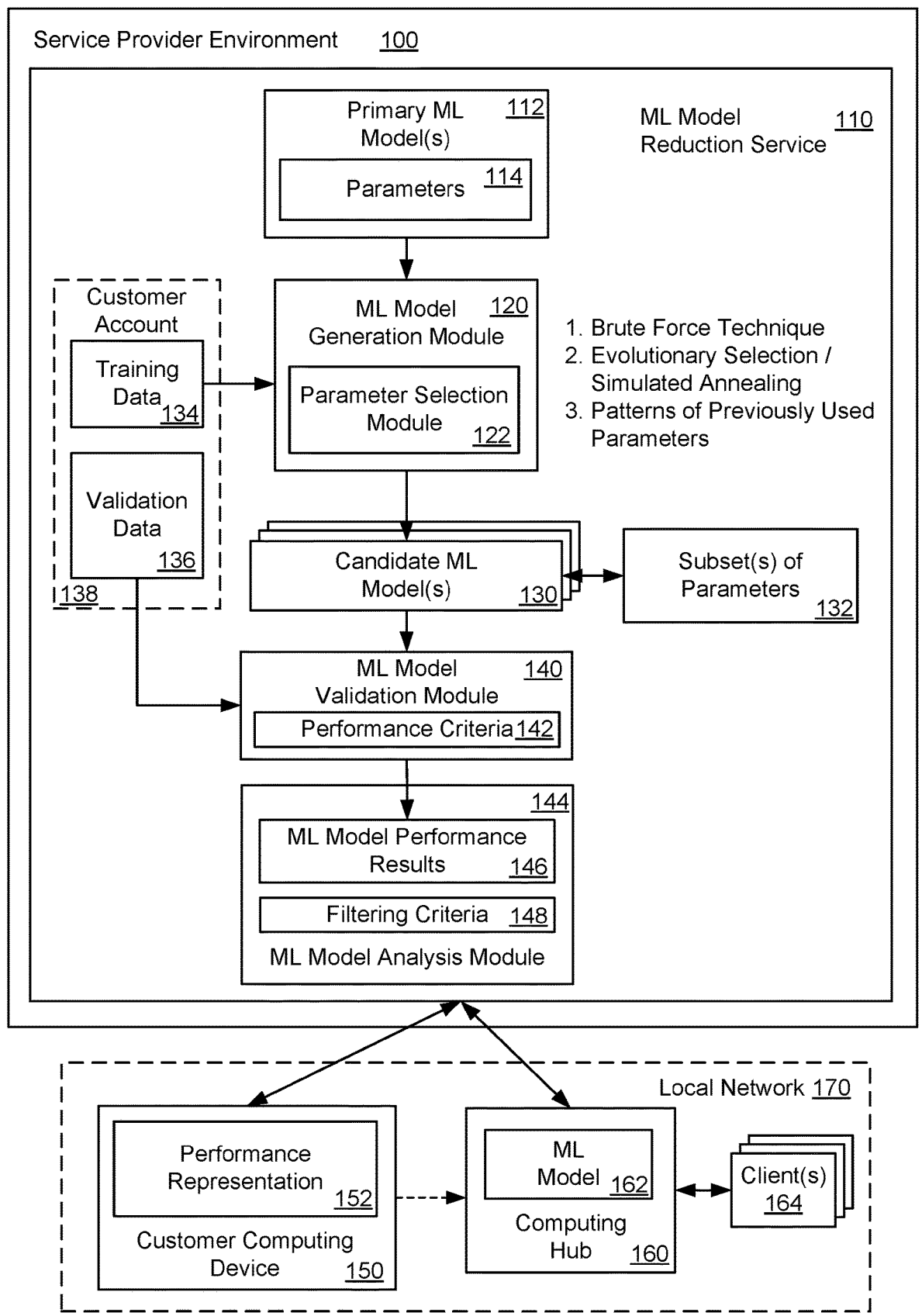
FIG. 1 illustrates a system and related operations for generating a plurality of candidate machine learning (ML) models with separate subsets of parameters and selecting one of the candidate ML models for delivery to a computing hub according to an example of the present technology.

A technology is described for providing a machine learning (ML) model from a ML model reduction service that operates in a service provider environment to a computing hub in a private network or local network (e.g., a local wireless or wired network). The ML model that is provided to the computing hub may be derived from a primary ML model in the service provider environment. For example, the ML model that runs on the computing hub may use a subset of tunable parameters, which may be selected from a set of tunable parameters that are used by the primary ML model. The subset of tunable parameters and the set of tunable parameters may include ML model parameters and/or hyper parameters. Therefore, the ML model that is provided to the computing hub may be a relatively simpler ML model as compared to the primary ML model, which may result in the ML model being more compatible with the constrained hardware and memory capabilities of the computing hub in the local network. In other words, since the processing requisite and/or the size of the primary ML model may not be compatible with the constrained processing and memory capabilities of the computing hub, a simplified version of the primary ML model may be generated in the service provider environment and run on the computing hub in the local network.

In one configuration, the ML model reduction service may receive a request for an ML model to be downloaded and run locally at the computing hub in the local network. The request may be for an ML model that is to be derived from the primary ML model in the service provider environment. In response to the request, the ML model reduction service may generate a plurality of candidate ML models that are derived from the primary ML model. An increased amount of compute resources in the service provider environment may be exploited to generate the plurality of candidate ML models. The candidate ML models may include a subset(s) of tunable parameters in relation to a full set of tunable parameters that is used by the primary ML model. In other words, the primary ML model may use the set of tunable parameters, and each candidate ML model may use a subset of the tunable parameters used by the primary ML model.

In an alternative example, the ML model reduction service may identify a separate source, an external source, or a third-party source for the plurality of candidate ML models that are derived from the primary ML model. For example, the ML model reduction service may receive the candidate ML models from an external source, such as from the customer or from a database of historical candidate ML models. The candidate ML models that are received from the external source may include subset(s) of tunable parameters in relation to the tunable parameters used by the primary ML model.

In one configuration, the ML model reduction service may select a separate subset of tunable parameters for each candidate ML model from the set of tunable parameters used by the primary ML model. The ML model reduction service may use several mechanisms for determining which subset of tunable parameters to select for each candidate ML model. In a first example, the ML model reduction service may utilize a brute force technique, in which each candidate ML model includes a subset of tunable parameters that is a mathematical permutation of the tunable parameters included in the set of tunable parameters for the primary ML model. The ML model reduction service may generate the plurality of candidate ML models from multiple combinations of the tunable parameters included in the set of tunable parameters for the primary ML model. In a second example, the ML model reduction service may utilize an evolutionary selection process or a simulated annealing technique for determining which subset of tunable parameters to select for each candidate model. In this example, the ML model reduction service may initially start with a selected subset of tunable parameters for a first candidate ML model and then elect to mutate a few tunable parameters (e.g., vary the selection of parameters which are predicted to improve the ML model) at each iteration for subsequent candidate ML models. In a third example, the ML model reduction service may select the subset of tunable parameters for each candidate ML model based on patterns of previously used subsets of tunable parameters for related types of candidate ML models that have been previously run by the ML model reduction service. For example, the ML model reduction service may select subset(s) of tunable parameters for the candidate ML models that have previously shown favorable results for related candidate ML model types.

In one example, the candidate ML models may be trained using training data associated with a customer account, in which usage of the training data to train the candidate ML models is authorized by the customer associated with the customer account.

In one configuration, the ML model reduction service may run validation data (or test data) against the candidate ML models to evaluate performance criteria for the candidate ML models. The validation data may be associated with the customer account, and usage of the validation data to validate or test the candidate ML models may be authorized by the customer associated with the customer account. In one example, the performance criteria to be evaluated for the candidate ML models may be defined by the customer. For example, the performance criteria may conform to a customer definition of an accuracy level of the candidate ML models, a processing speed or processing time of the candidate ML models and/or a model size of the candidate ML models (e.g., memory size).

In an alternative example, the training data used to train the candidate ML models and/or the validation data used to validate the candidate ML models may be leased from a third party data provider. In this example, the training data and/or the validation data may not be associated with the customer account. In other words, the customer may not have ownership rights to the training data and/or the validation data, but may simply use data leased from the third party data provider for training and validation purposes.

In one example, the ML model reduction service may generate ML model performance results for the candidate ML models and provide a performance representation of the ML model performance results for display or analysis. The performance representation may include the candidate ML models that were generated and tested with respect to the performance criteria (e.g., accuracy, processing time, model size). In addition, candidate ML models that do not satisfy a relative threshold as indicated in the ML model performance results may be filtered from the performance representation. In other words, the performance representation may include efficient candidate ML models (in terms of the performance criteria) that satisfy the relative threshold, while inefficient candidate ML models that do not satisfy the relative threshold may be removed from the performance representation. The efficient versus inefficient candidate ML models may be identified using machine learning techniques, such as a clustering technique, a neural network, classification, supervised machine learning, regression, etc. For example, the relative threshold may be based on the performance curve and candidate ML that are less that a certain percentage of the performance curve level or are more than one standard deviation from the performance curve maybe filtered out.

In one example, the ML model reduction service may receive a selection of an ML model from the performance representation of the candidate ML models. The ML model may be selected based on the ML model performance results, as indicated in the performance representation. The ML model reduction service may provide the ML model selected from the performance representation for download and execution on the computing hub in the local network. The computing hub may serve to provide virtualize computing services to devices in the network and also serve as an access point, a wireless gateway, a router, a switch or a wireless access point to the internet. The ML model that runs on the computing hub may analyze data that is received at the computing hub (e.g., from devices in the local network). In addition, the ML model that runs on the computing hub in the local network may benefit from an increased amount of data and a relative proximity to the data, as opposed to the ML model being run in the service provider environment.

FIG. 1 illustrates an exemplary system and related operations for generating a plurality of candidate machine learning (ML) models 130 with separate subsets of parameters 132 and selecting one of the candidate ML models 130 for delivery to a computing hub 160 in a local network 170. The candidate ML models 130 may be generated using an ML model reduction service 110 that operates in a service provider environment 100. One of the candidate ML models 130 may be selected via a customer computing device 150, and a selected ML model 162 may be delivered from the ML model reduction service 110 in the service provider environment 100 to the computing hub 160 in the local network 170.

In one example, the customer computing device 150 may send a request to download an ML model 162 from the ML model reduction service 110 and run the ML model 162 locally at the computing hub 160, where the ML model 162 that is to run on the computing hub 160 may be derived from a primary ML model 112 in the service provider environment 100. In one example, a customer associated with the customer computing device 150 may design and build the primary ML model 112, but due to increased processing and memory requisites for the primary ML model 112, the primary ML model 112 may reside and run in the service provider environment 100 (as opposed to running on the computing hub 160 in the local network 170). However, in some cases, it may be desirable for the customer to run ML models at the computing hub 160 in the local network 170 to benefit from an increased amount of data and a relative proximity to the data. Since it may be infeasible to run the primary ML model 112 at the computing hub 160 due to the processing and memory used for the primary ML model 112, the customer computing device 150 may send the request for a simplified ML model 162 that is to be derived from the primary ML model 112. In addition, the simplified ML model may conform to the performance criteria set for an accuracy level of the candidate ML models, a processing speed or processing time of the candidate ML models and/or a model size of the candidate ML models (e.g., memory size).

The requested ML model 162 to be run on the computing hub 160 may be a simplified version of the primary ML model 112 due to the reduced processing and memory capabilities of the computing hub 160. For example, the primary ML model 112 may be associated with a set of tunable parameters 114, while the ML model 162 for the computing hub 160 may include a subset of the tunable parameters of the primary ML model 112, thereby reducing processing and storage used for the ML model 162. As a result, the ML model 162 may be better suited to operate on the computing hub 160 in the local network 170. The subset of tunable parameters 132 and the set of tunable parameters 114 may include ML model parameters and/or hyper parameters.

In another example, the customer computing device 150 may send a request to download an ML model 162 from the ML model reduction service 110, where the ML model 162 is to be derived from a predefined primary ML model 112 that resides in the service provider environment 100. In other words, in this example, the customer associated with the customer computing device 150 may not design and build the primary ML model 112. Rather, the primary ML model 112 may be prebuilt for a particular use case. The primary ML model 112 may be too complex to efficiently run at the computing hub 160, so the customer computing device 150 may send the request for a simplified ML model 162 that is derived from a predefined primary ML model 112 for the particular use case.

As non-limiting examples, the primary ML model 112 and the ML model 162 that is to be derived from the primary ML model 112 may be related to machine learning models for: user recommendations, computer vision (e.g., object recognition), speech and handwriting recognition, natural language processing, fraud detection, financial market analysis, time series forecasting, medical diagnosis, etc.

In one configuration, the ML model reduction service 110 may receive the request for an ML model 162 from the customer computing device 150. The ML model reduction service 110, via an ML model generation module 120, may generate a plurality of candidate ML models 130 that are derived from the primary ML model 112. The candidate ML models 130 may have a subset(s) of tunable parameters 132 in relation to the set of tunable parameters 114 used by the primary ML model 112. In other words, the primary ML model 112 may use the set of tunable parameters 114, and the ML model generation module 120 may generate each candidate ML model 130 to include a subset of the tunable parameters 114 used by the primary ML model 112.

As a non-limiting example, the set of tunable parameters 114 for the primary ML model 112 may include hundreds of parameters, whereas the subset(s) of tunable parameters 132 for the candidate ML models 130 may include tens of parameters. As a result, each of the candidate ML models 130 may be less complex as compared to the primary ML model 112 but the candidate ML models 130 may be tuned for performance in areas defined by the customer, as described earlier.

In one configuration, the ML model generation module 120 may include a parameter selection module 122 to select a separate subset of tunable parameters 132 for each candidate ML model 130 from the set of tunable parameters 114 used by the primary ML model 112. These separate subsets may also vary, be distinct, or be different than other subsets used with the candidate ML models 130. The parameter selection module 122 may use various mechanisms for determining which subset of tunable parameters 132 to select for each candidate ML model 130, such as a brute force technique, an evolutionary (or genetic) selection process or a simulated annealing technique, or based on previously used subsets of tunable parameters.

In one example, the parameter selection module 122 may utilize a brute force technique to select the subset(s) of tunable parameters 132 for the candidate ML models 130, in which each candidate ML model 130 may include a subset of tunable parameters 132 that is a permutation of tunable parameters included in the set of tunable parameters 114 for the primary ML model 112. The parameter selection module 122 may a few combinations or up to all of the combinations of the tunable parameters 114 in the primary ML model 112 for generation of the corresponding candidate ML models 130. Therefore, the ML model generation module 120 may generate the candidate ML models 130 such that each candidate ML model 130 includes a subset of tunable parameters 132 that corresponds to a particular combination of the tunable parameters 114 in the primary ML model 112.

As a non-limiting example, the primary ML model 112 may include a set of 10 tunable parameters. In this example, when applying the brute force technique, the parameter selection module 122 may select up to 10-factorial combinations of the 10 tunable parameters, and the ML model generation module 120 may generate 10-factorial candidate ML models 130 to correspond to the 10-factorial combinations of the 10 tunable parameters. In another example, when applying the brute force technique, the parameter selection module 122 may select up to up to $2^{10}$ combinations of the 10 tunable parameters (e.g., whether each parameter is included is binary and there are 10 parameters), and the ML model generation module 120 may generate $2^{10}$ candidate ML models 130 to correspond to the $2^{10}$ combinations of the 10 tunable parameters In another example, the parameter selection module 122 may utilize the evolutionary (or genetic) selection process or the simulated annealing technique to select the subset(s) of tunable parameters 132 for the candidate ML models 130. For example, the parameter selection module 122 may initially assign a subset of tunable parameters 132 for a first candidate ML model, where the subset may include tunable parameters that are randomly selected from the tunable parameters 114 in the primary ML model 112. Using an iterative process, the parameter selection module 122 may assign a subset of tunable parameters 132 for a second candidate ML model, where the subset may include a few tunable parameters that are mutated in relation to the subset of tunable parameters 132 for the first candidate ML model. In other words, at each iteration, the parameter selection module 122 may elect to mutate a few of the tunable parameters from a previous candidate ML model for a current candidate ML model. Therefore, the ML model generation module 120 may generate the candidate ML models 130 that correspond to the subsets of tunable parameters 132 that are derived using the evolutionary selection process or the simulated annealing technique.

As a non-limiting example, the primary ML model 112 may include a set of 20 tunable parameters. In this example, when applying the evolutionary selection process or the simulated annealing technique, the parameter selection module 122 may select 8 of the 20 tunable parameters in a first iteration to include in a subset of tunable parameters 132 for a first candidate ML model. In a second iteration, the parameter selection module 122 may modify 4 tunable parameters out of the 8 tunable parameters for inclusion in a subset of tunable parameters 132 for a second candidate ML model. In a third iteration, the parameter selection module 122 may modify 2 tunable parameters out of the 8 tunable parameters (of which 4 tunable parameters were previously modified) for inclusion in a subset of tunable parameters 132 for a third candidate ML model. The ML model generation module 120 may generate the first, second and third candidate ML models to include the respective subsets of tunable parameters 132, which may have been selected using the evolutionary selection process or the simulated annealing technique.

In yet another example, the parameter selection module 122 may utilize previously used subsets of tunable parameters to select the subset(s) of tunable parameters 132 for the candidate ML models 130. For example, the parameter selection module 122 may have access to a data store or model that contains patterns (e.g., heuristic patterns) of previously used subsets of tunable parameters for related types of candidate ML models that have been previously run by the ML model reduction service 110. In other words, the data store or model may include previously used subsets of tunable parameters that have shown favorable results (e.g., increased accuracy) for related candidate ML model types. Therefore, depending on a model type of the ML model 162 to be run on the computing hub 160 (e.g., image recognition), the parameter selection module 122 may identify previously used subsets of tunable parameters to include in the subset(s) of tunable parameters 132 for the candidate ML models 130. Therefore, the ML model generation module 120 may generate the candidate ML models 130 to include the subset(s) of tunable parameters 132 that are selected based on the previously used subsets of tunable parameters.

As a non-limiting example, the parameter selection module 122 may receive an indication that the ML model 162 to be run on the computing hub 160 is for fraud detection. The parameter selection module 122 may access the data store or model that contains the patterns of previously used subsets of tunable parameters for a number of distinct ML model types, and the parameter selection module 122 may identify previously used subsets of tunable parameters for previous fraud detection ML models. These previously used subsets of tunable parameters may have produced favorable results (e.g., increased accuracy of the ML model) when used for the previous fraud detection ML models. Therefore, the parameter selection module 122 may select these previously used subsets of tunable parameters for the subset(s) of tunable parameters 132 for the candidate ML models 130 related to fraud detection.

In one configuration, the ML model generation module 120 may generate the candidate ML models 130 with corresponding subsets of tunable parameters 132 (using one or more of the three mechanisms as discussed). The ML model generation module 120 may train the candidate ML models 130 using training data 134. The training data 134 may be associated with a customer account 138 that belongs to the customer. The usage of the training data 134 to train the candidate ML models 130 may be authorized by the customer associated with the customer associated with the customer account 138.

As a non-limiting example, the training data 134 may be used to train the candidate ML models 130 to recognize faces of individuals. In this example, the training data 134 may include a set of images and a set of names associated with the images. In other words, a name of an individual may be positively associated with an image of that individual. In this example, the training data 134 may be labeled data because there is provided a truth that positively correlates certain images to certain names of individuals.

In one example, the ML model generation module 120 may provide the candidate ML models 130 to an ML model validation module 140 in the ML model reduction service 110. The ML model validation module 140 may run validation data 136 (or test data) against each of the candidate ML models 130 to evaluate performance criteria 142 for the candidate ML models 130. The validation data 136 may be associated with the customer account 138 that belongs to the customer. The usage of the validation data 136 to evaluate a performance or efficacy of the candidate ML models 130 may be authorized by the customer associated with the customer associated with the customer account 138. In addition, the ML model validation module 140 may run the candidate ML models 130 on a type of hardware that has a capability corresponding to the computing hub 160 that is to run one of the candidate ML models 130, which may result in a more accurate and realistic performance evaluation of the candidate ML models 130.

In one example, the ML model validation module 140 may evaluate the candidate ML models 130 based on the performance criteria 142 that are received from the customer computing device 150. The performance criteria 142 may include, but are not limited to, an accuracy level of the candidate ML models 130, a processing speed or processing time of the candidate ML models 130 and/or a model size of the candidate ML models 130. In other words, a customer associated with the candidate ML models 130 may wish to evaluate the candidate ML models 130 based on accuracy, processing speed/time and/or model size, depending on specific criteria that are important for a type of use case implemented by the customer.

In one configuration, the ML model validation module 140 may evaluate the candidate ML models 130 and generate ML model performance results 146. The ML model performance results 146 may indicate a relative performance for each of the candidate ML models 130 in relation to the performance criteria 142 received from the customer computing device 150 (e.g., accuracy, processing speed/time and/or model size). The ML model performance results 146 may be measured in multiple dimensions depending on a number of measures included in the performance criteria 142 for evaluating the candidate ML models 130.

As a non-limiting example, with respect to a primary ML model 112 related to financial market analysis, the ML model performance results 146 may indicate that a first candidate ML model has an accuracy of 90% and a model size of 50 megabytes (MB) seconds, while a second candidate ML model has an accuracy of 95% with a model size of 80 GB. As another non-limiting example, with respect to a primary ML model 112 related to speech recognition, the ML model performance results 146 may indicate that a first candidate ML model has an accuracy of 80% and a processing time of 0.5 seconds, while a second candidate ML model has an accuracy of 90% with a processing time of 0.9 seconds.

The ML model validation module 140 may provide the ML model performance results 146 to an ML model analysis module 144 in the ML model reduction service 110. Based on the ML model performance results 146, the ML model analysis module 144 may be engaged to better identify relatively efficient candidate ML models 130 versus relatively inefficient candidate ML models, in relation to the performance criteria 142 that are used to evaluate the candidate ML models 130. In one example, the ML model analysis module 144 may identify the relatively efficient candidate ML models 130 versus the relatively inefficient candidate ML models using a clustering technique, a neural network, supervised machine learning, regression, etc. The ML model analysis module 144 may estimate a regression function for the ML model performance results 146, such that candidate ML models 130 that are along the function or curve (or within a defined margin of the function) may be regarded as relatively efficient ML solutions. On the other hand, candidate ML models 130 that are outside of the range of the function by a defined margin may be regarded as relatively inefficient ML solutions.

In one example, the ML model analysis module 144 may generate a performance representation 152 of the candidate ML models 130 based on the ML model performance results 146. The performance representation 152 may include each of the candidate ML models 130 in relation to the performance criteria 142 received from the customer computing device 150 (e.g., accuracy, processing speed/time and/or model size). The ML model analysis module 144 may exclude certain candidate ML models 130 from the performance representation 152. For example, candidate ML models 130 that were found to be relatively inefficient ML models may be excluded from the performance representation 152, while the candidate ML models 130 that were found to be relatively efficient candidate ML models may be included in the performance representation 152.

In another example, the ML model analysis module 144 may apply filtering criteria 148 to exclude certain candidate ML models 130 from the performance representation 152. For example, based on the ML model performance results 146, the ML model analysis module 144 may identify candidate ML models 130 that do not satisfy a relative threshold for the performance criteria 142, as defined by the filtering criteria 148. As a result, the ML model analysis module 144 may exclude these candidate ML models 130 from the performance representation 152.

As a non-limiting example, the ML model performance results 146 may indicate that a first candidate ML model has an accuracy of 80% and a processing time of 8 seconds, a second candidate ML model has an accuracy of 90% and a processing time of 10 seconds, and a third candidate ML model has an accuracy of 92% and a processing time of 28 seconds. In this example, the ML model analysis module 144 may determine that the first candidate ML model and the second candidate Ml model are relatively efficient ML models, whereas the third candidate ML model is a relatively inefficient ML model. In other words, since only a slight increase in accuracy is achieved in a relatively larger period of processing time for the third candidate ML model, in relation to the first and second candidate ML models, the third candidate ML model may be considered a relatively inefficient ML solution. In this case, the third candidate ML model may not satisfy a relative threshold for accuracy and processing time (in relation to the first and second candidate ML models). Therefore, when the ML model analysis module 144 generates the performance representation 152, the ML model analysis module 144 may exclude the third candidate ML model from the performance representation 152, while the first and second candidate ML models may be included in the performance representation 152.

In one configuration, the ML model analysis module 144 may provide the performance representation 152 of the ML model performance results 146 (which may exclude the relatively inefficient ML models) to the customer computing device 150 for display on the customer computing device 150. The customer associated with the customer computing device 150 may view the performance representation 152 to learn of the relatively efficient candidate ML models 130 that are available to run on the computing hub 160. Depending on a specific use case of the customer, the customer may select, via a user interface on the customer computing device 150, one of the candidate ML models 130 that is included in the performance representation 152. The customer may select the candidate ML model 130 based on the ML model performance results 146. The customer computing device 150 may provide a selection of the candidate ML model 130 from the performance representation 152 to the ML model reduction service 110.

As a non-limiting example, a customer may intend to use a facial recognition ML model in a retail store. For this use case, the customer may wish for a medium blend of accuracy, processing time and model size. Therefore, based on this use case, the customer may not select a candidate ML model 130 from the performance representation 152 that is associated with a high accuracy, a large processing time and a large model size, nor would the customer select a candidate ML model 130 from the performance representation 152 that is associated with a low accuracy, a low processing time and a small model size, even if both of these candidate ML models 130 were included in the performance representation 152 as being relatively efficient candidate ML models. As another non-limiting example, a customer may intend to use a facial recognition ML model in a prison. For this use case, the customer may wish for an extremely high accuracy, regardless of processing time and model size. Therefore, based on this use case, the customer may select a candidate ML model 130 from the performance representation 152 with extremely high accuracy and is regarded as being relatively efficient. As yet another non-limiting example, a customer may have 100 MB to allocate for a facial recognition ML model, but the primary ML model 112 is 500 MB. In this example, the customer may select a candidate ML model 130 that provides a best blend of accuracy and processing time, and is within the model size constraint of 100 MB.

In one example, the ML model reduction service 110 may receive the selection of the candidate ML model 130 from the customer computing device 150. In response, the ML model reduction service 110 may provide the ML model 162 (which corresponds to the selected candidate ML model) for download and execution on the computing hub 160 (or a computing node) in the local network 170 of a customer. The computing hub 160 may serve as a distributed computing node, an access point, a wireless gateway, a router, a switch or a wireless access point to the internet. In one example, the ML model reduction service 110 may provide the ML model 162 to the customer computing device 150, and the customer computing device 150 may forward the ML model 162 to the computing hub 160. Alternatively, after receiving the selection, the ML model reduction service 110 may directly send the ML model 162 to the computing hub 160. After the ML model 162 is provided to the computing hub 160, the ML model reduction service 110 may delete the candidate ML models 130 and any data artifacts associated with the generation of the candidate ML models 130 from the service provider environment 100.

In one example, the computing hub 160 may receive the ML model 162, and the computing hub 160 may run the ML model 162 to analyze data that is received at the computing hub 160 from client(s) 164 in the local network 170. The ML model 162 may include a model graph definition and a set of parameter files. The ML model 162 may be compatible with a hardware and memory specification of the computing hub 160 that is running the ML model 162, as opposed to the primary ML model 112 which may not be compatible with the hardware and memory specification of the computing hub 160. In addition, the ML model 162 may benefit from an increased amount of data and a relative proximity to the data that flows through the local network 170.

As a non-limiting example, the primary ML model 112 may be 1.5 gigabytes (GB) with hundreds of tunable parameters, which may be too large to run on the computing hub 160. Based on the above process, rather than running the 1.5 GB ML model on the computing hub 160, the computing hub 160 may run a simplified or reduced version of the primary ML model 112, which may only have tens of tunable parameters (that are derived from the hundreds of tunable parameters). By utilizing the increased amount of compute resources that are available in a cloud computing environment, candidate ML models with variations of the tunable parameters may be built and tested. A simplified ML model that is derived from the primary ML model 112, but provides a relatively efficient blend of accuracy, processing speed, model size, etc., may be selected and run on the computing hub 160.

In one configuration, the computing hub 160 may receive multiple candidate ML models 130 from the ML model reduction service 110, and the multiple candidate ML models 130 may be evaluated and tested on the computing hub 160 using real-world data received at the computing hub 160. Over a period of time, the computing hub 160 may determine that a certain candidate ML model 130 produces more accurate results as compared to the other candidate ML models 130. The computing hub 160 may indicate this candidate ML model 130 to the ML model reduction service 110. The ML model reduction service 110 may generate additional candidate ML models 130 that are derived from that candidate ML model 130, and the process may be repeated until a particular ML model 162 is selected and executed on the computing hub 160.

Figure 2:
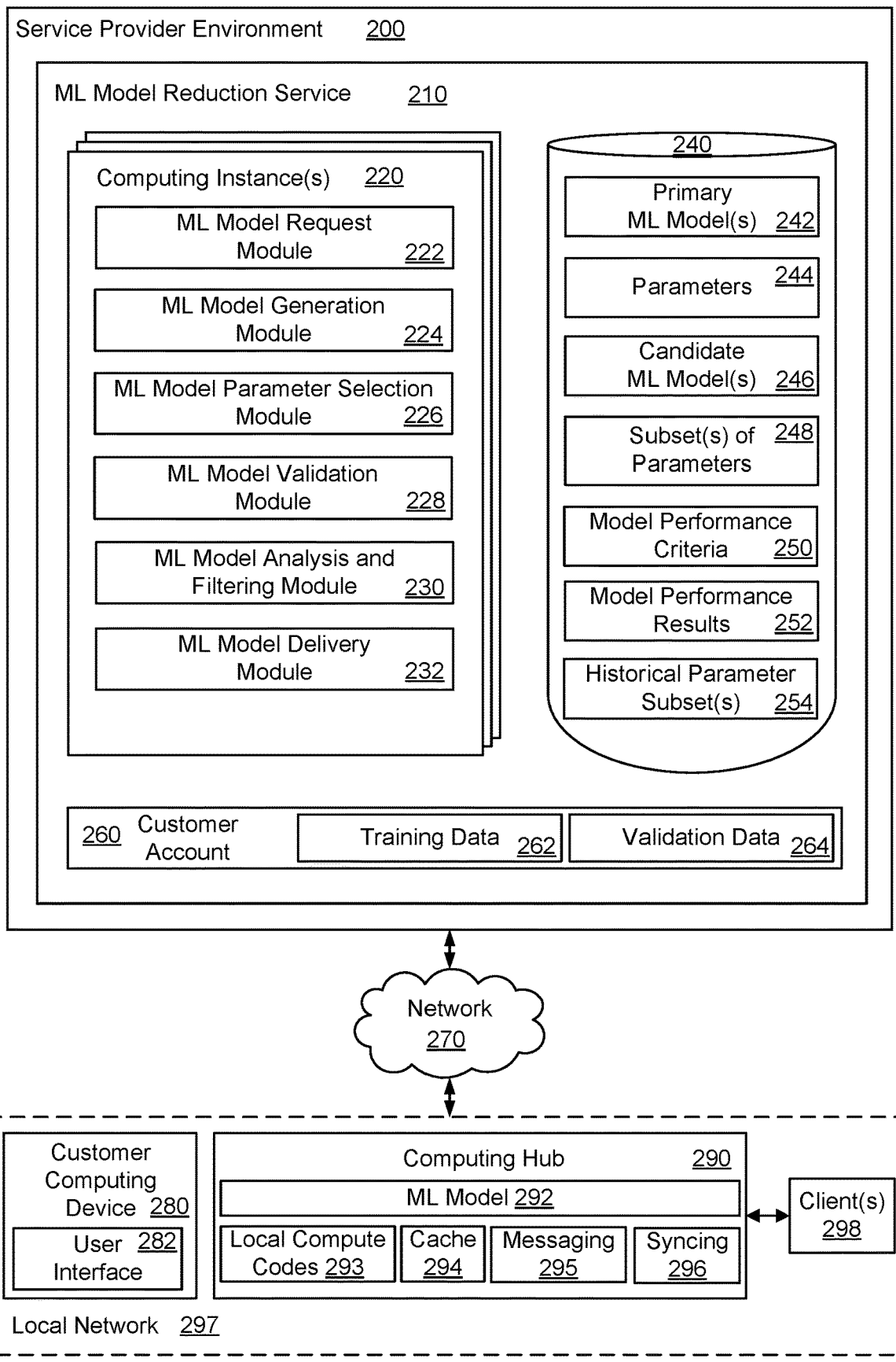
FIG. 2 is an illustration of a networked system for generating a plurality of candidate machine learning (ML) models with separate subsets of parameters and selecting one of the candidate ML models for delivery to a computing hub according to an example of the present technology.

FIG. 2 illustrates example components of the present technology in a service provider environment 200. The service provider environment 200 may operate a machine learning (ML) model reduction service 210. The ML model reduction service 210 may utilize one or more computing instances 220 (or alternatively servers) and data store(s) 240 for generating a plurality of candidate ML models 246 that are derived from a primary ML model 242, and providing an ML model 292 selected from the candidate ML models 246 to a computing hub 290 in a local network 297 (e.g., a wireless network). The ML model reduction service 210 may be in communication with a customer computing device 280 over a network 270. The customer computing device 280 may be used to select the ML model 292 for the computing hub 290 from the plurality of candidate ML models 246 via a user interface 282 of the customer computing device 280. In one example, the ML model reduction service 210 may deliver the ML model 292 to the customer computing device 280, and the customer computing device 280 may forward the ML model 292 to the computing hub 290 in the local network 297. Alternatively, the ML model reduction service 210 may deliver the ML model 292 directly to the computing hub 290 in the local network 297. The computing hub 290 may run the ML model 292 to analyze data that is received at the computing hub 290.

In one example, the data store 240 may include primary ML models 242. The primary ML models 242 may be full-sized ML models that are associated with a set of parameters 244. The set of parameters 244 may include ML model parameters and/or hyper parameters. The primary ML models 242 may be associated with a particular use case. For example, the primary ML models 242 may be related to user recommendations, computer vision (e.g., object recognition), speech and handwriting recognition, natural language processing, fraud detection, financial market analysis, time series forecasting, medical diagnosis, etc. The primary ML models 242 may be configured by the customer computing device 280 and stored in the service provider environment 200, or alternatively, the primary ML models 242 may be predefined ML models that are configured by the service provider environment 200.

In one example, the data store 240 may include the candidate ML models 246. The candidate ML models 246 may be simplified or reduced versions of a particular primary ML model 242. In other words, the candidate ML models 246 may be derived from a particular primary ML model 242. The candidate ML models 246 may have subset(s) of parameters 248. The subset(s) of parameters 248 may include ML model parameters and/or hyper parameters. In other words, the parameters 248 associated with the candidate ML models 246 may be a subset of the set of parameters 244 associated with a particular primary ML model 242.

In one example, the data store 240 may include model performance criteria 250. The model performance criteria 250 may be used to evaluate the candidate ML models 246. A definition for the model performance criteria 250 may be received from the customer computing device 280. For example, the model performance criteria 250 may specify to evaluate the candidate ML models 246 based on an accuracy level of the candidate ML models 246, a processing speed of the candidate ML models 246 and/or a model size of the candidate ML models 246.

In one example, the data store 240 may include model performance results 252. The model performance results 252 may indicate a performance or an efficacy of the candidate ML models 246 in relation to the model performance criteria 250. For example, the model performance results 252 may indicate, for each candidate ML model 246, an accuracy level, a processing speed and/or model size based on the model performance criteria 250.

In one example, the data store 240 may include historical parameter subset(s) 254. The historical parameter subset(s) 254 may include patterns of previously used subsets of parameters for various types of candidate ML models that have been previously run by the ML model reduction service 210. For example, the historical parameter subset(s) 254 may include previously used subsets of parameters that have shown favorable results (e.g., increased accuracy) for various candidate ML model types.

The computing instance(s) 220 operated by the ML model reduction service 210 may utilize a number of modules for generating the plurality of candidate ML models 246. The computing instance(s) 220 may include an ML model request module 222, an ML model generation module 224, an ML model parameter selection module 226, an ML model validation module 228, an ML model analysis and filtering module 230, an ML model delivery module 232, and other applications, services, processes, systems, engines, or functionality not discussed in detail herein.

The ML model request module 222 may receive a request for an ML model 292 from the customer computing device 280. The request may be for an ML model 292 to be downloaded and executed locally at the computing hub 290 in the local network 297. In addition, the request may be for an ML model 292 that is derived from a particular primary ML model 242.

The ML model generation module 224 may generate a plurality of candidate ML models 246 that are derived from the primary ML model 242. The ML model generation module 224 may select, via the ML model parameter selection module 226, the subsets of parameters 248 to be associated with the candidate ML models 246, respectively. In addition, the ML model generation module 224 may train the candidate ML models 246 using training data 262 associated with a customer account 260.

The ML model validation module 228 may run the candidate ML models 246 against validation data 264 (or test data) to evaluate a performance or efficacy of the candidate ML models 246. The validation data 264 may be associated with the customer account 260. The ML model validation module 228 may evaluate the candidate ML models 246 based on the model performance criteria 250 received from the customer computing device 280.

The ML model analysis and filtering module 230 may analyze the model performance results 252 to identify relatively efficient candidate ML models 246 versus relatively inefficient candidate ML models 246. The ML model analysis and filtering module 230 may generate a performance representation of the model performance results 252 for delivery and display at the customer computing device 280. The performance representation may exclude the relatively inefficient candidate ML models 246. In other words, the ML model analysis and filtering module 230 may filter candidate ML models 246 that do not satisfy a relative threshold in relation to the model performance criteria 250 and may be filtered from the performance representation.

The ML model delivery module 232 may provide an ML model 292 to the computing hub 290, either directly or via the customer computing device 280. The ML model 292 that is provided may correspond to a candidate ML model 246 selected from the performance representation. The ML model delivery module 232 may provide the ML model 292 to enable a local execution of the ML model 292 at the computing hub 290.

The customer computing device 280 may comprise, for example a processor-based system. The customer computing device 280 may be a device such as, but not limited to, a desktop computer, laptop or notebook computer, tablet computer, mainframe computer system, handheld computer, workstation, network computer, or other devices with like capability.

The computing hub 290 (or a computing node) may serve as a distributed computing hub, an access point, a wireless gateway, a router, a switch or a wireless access point to the internet. The computing hub 290 may be able to securely run local compute functions, messaging, data caching and synchronization capabilities for devices (not shown) that are connected to the computing hub 290 in the local network 297. The computing hub 290 may locally execute program code or program functions on behalf of the devices that are connected to the computing hub 290 in the local network 297. In addition, the computing hub 290 may be in communication with service(s) operating in the service provider environment 200.

In one configuration, the computing hub 290 may include local compute codes 293, which may be instructions for execution at the computing hub 290. The local compute codes 293 may be similar to compute code functions that may be executed in a compute service in the service provider environment 200, but these functions may be available to execute at client(s) 298 without accessing the service provider environment 200. For example, computing instances may be provided in the computing hub 290, and the local compute codes 293 or compute code functions may execute using a local compute service in the computing hub 290. The local compute codes 293 or compute code functions may be portions of code that may be executed using the local compute service at a request of the clients 298, and return results may be provided to the client(s) 298. The local compute codes 293 may be functions that launch in a container on a computing instance of the computing hub 290 and are segments of program code that are capable of receiving parameters, performing processing, and returning values. In addition, the local compute codes 293 may be terminated at the computing hub 290 once the local compute codes return values.

In one example, the computing hub 290 may further include a cache 294 for storing device reporting data or state data from the client(s) 298 while the service provider environment 200 is inaccessible. When the service provider environment 200 becomes accessible again, the device data or state data may be uploaded from the cache 294 to the service provider environment 200. In another example, the computing hub 290 may further include messaging services 295 for providing messaging between the client(s) 298. In yet another example, the computing hub 290 may further include a syncing service 296 that is used to sync data and device states from the client(s) 298 to shadow device states in the service provider environment 200. More specifically, the computing hub 290 may cache the state of the client(s) 298, using a virtual version, or "shadow," of each client 298, which tracks the client's current versus a desired state. These localized shadow states may be synchronized with shadow states in the service provider environment 200.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 270 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
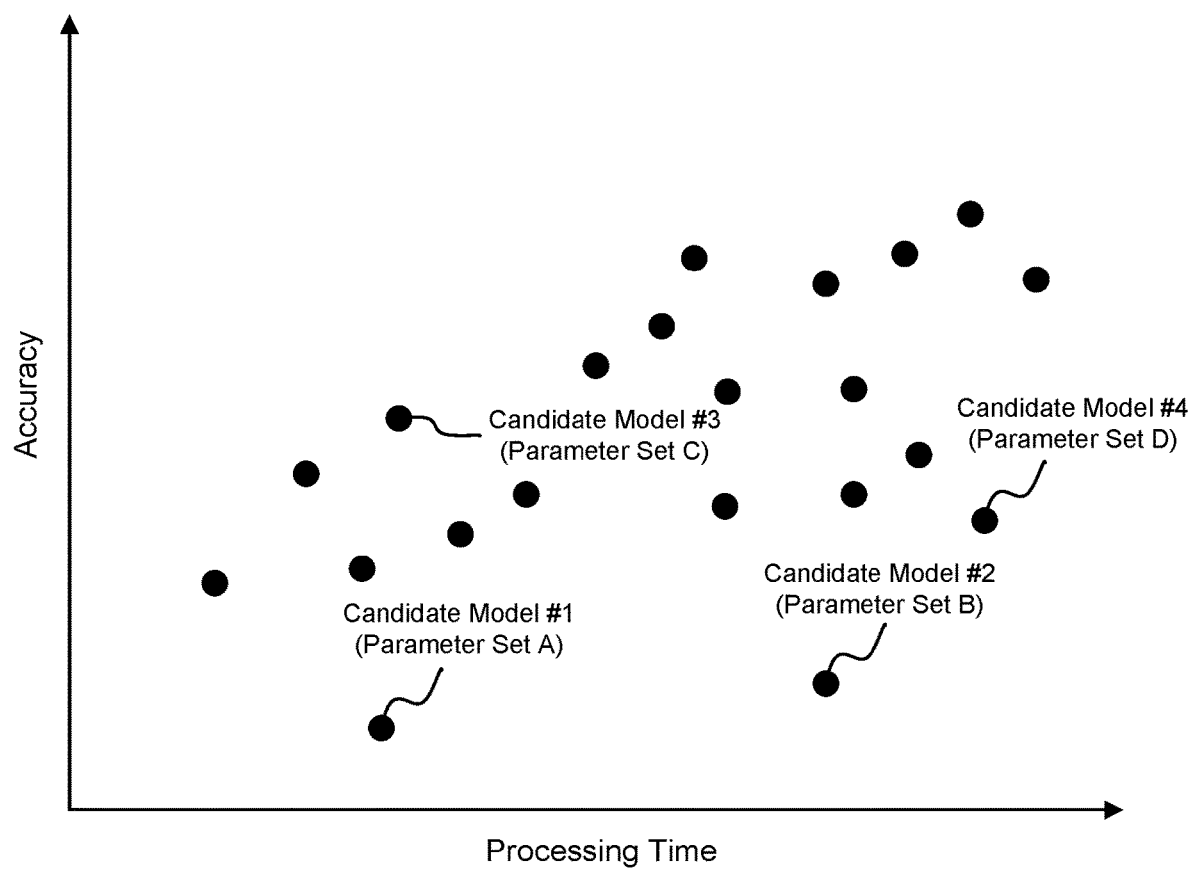
FIG. 3 is a performance representation of a plurality of candidate machine learning (ML) models in relation to an accuracy of the ML models versus a processing time of the ML models according to an example of the present technology.

FIG. 3 is an example of a performance representation of a plurality of candidate machine learning (ML) models in relation to an accuracy of the ML models versus a processing time of the ML models. In the performance representation, each candidate ML model may be plotted with respect to the accuracy and the processing time. In the performance representation, each point may represent a particular candidate ML model that is associated with a particular subset of tunable parameters. As a non-limiting example, the plurality of candidate ML models that are plotted may include candidate model #1 with a parameter set A, candidate model #2 with a parameter set B, candidate model #3 with a parameter set C and candidate model #4 with a parameter set D.

Figure 4:
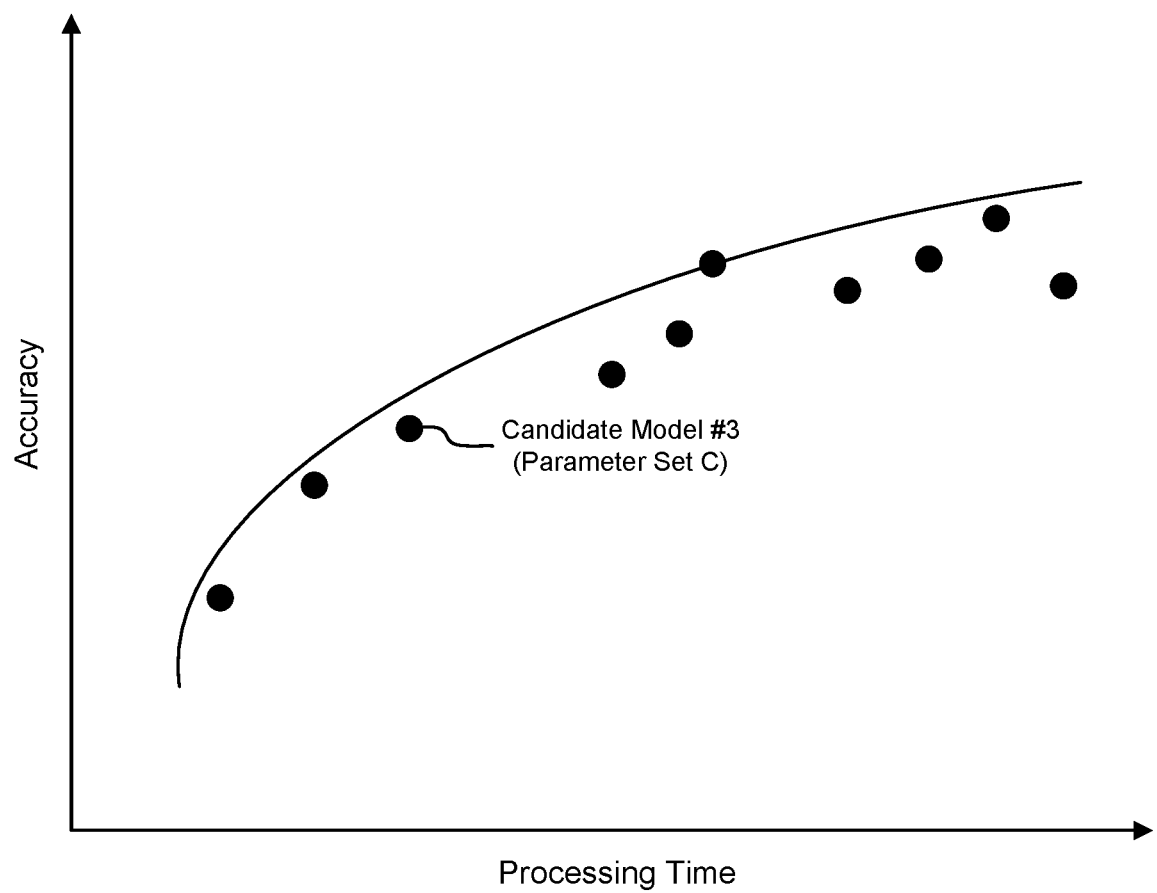
FIG. 4 is a performance representation of a plurality of candidate machine learning (ML) models in relation to an efficiency curve according to an example of the present technology.

FIG. 4 is an example of a performance representation of a plurality of candidate machine learning (ML) models in relation to an efficiency curve (e.g., an efficient frontier) according to an example of the present technology. The efficiency curve may be determined using a curve fitting technique, a clustering technique, a neural network, supervised machine learning, regression, etc. Candidate ML models that are within a defined margin from the efficiency curve may be considered relatively efficient ML models, while candidate ML models that are outside a defined margin of the efficiency curve may be considered relatively inefficient ML models. The candidate ML models that are considered to be relatively inefficient may be removed from the performance representation. As a non-limiting example, candidate model #3 with a parameter set C may be included in the performance representation, whereas candidate model #1 with a parameter set A, candidate model #2 with a parameter set B, and candidate model #4 with a parameter set D (from FIG. 3) may be removed from the performance representation.

Figure 5:
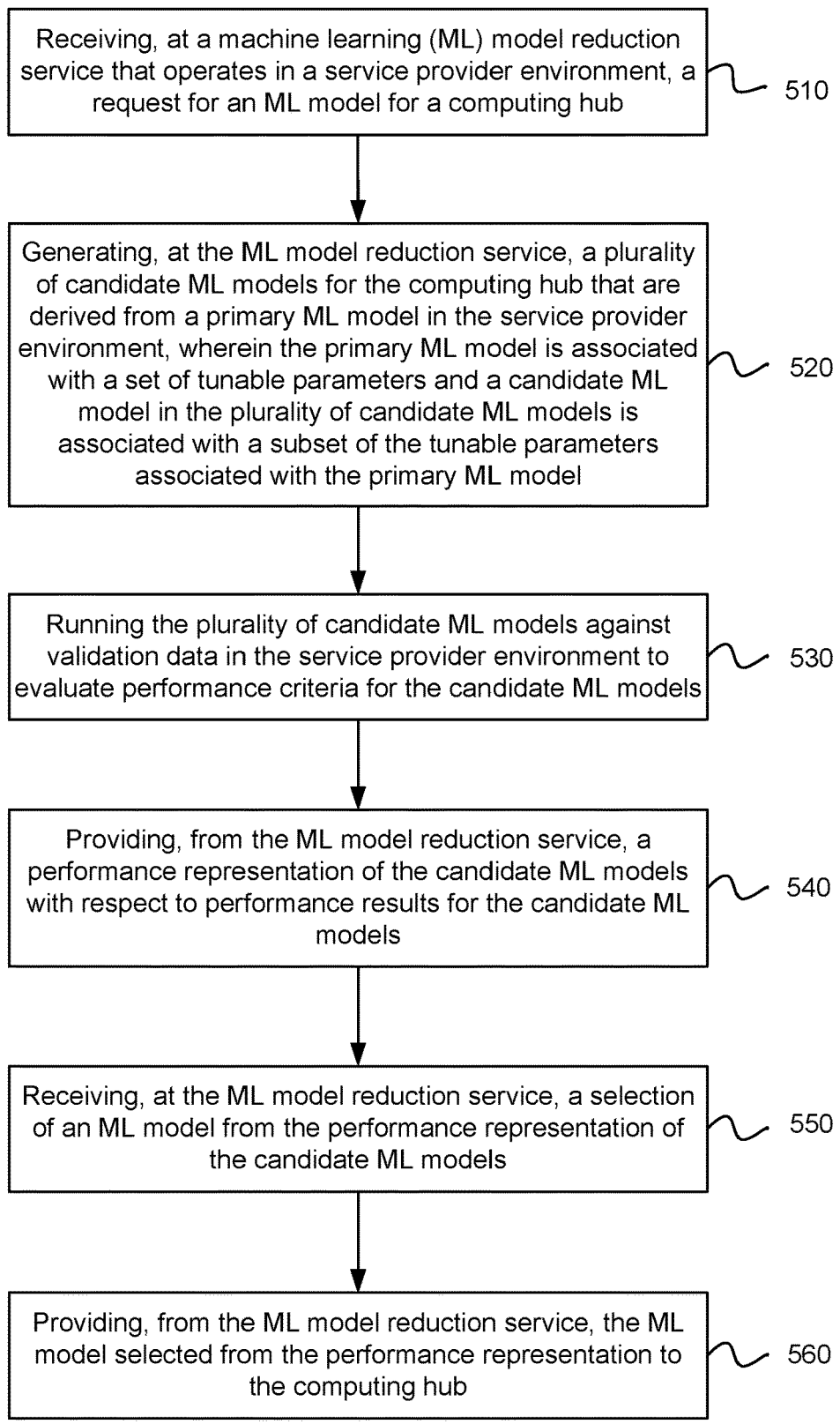
FIG. 5 is a flowchart of an example method for providing a machine learning (ML) model to a computing hub.

FIG. 5 illustrates an example of a method for providing a machine learning (ML) model to a computing hub. A request may be received at an ML model reduction service that operates in a service provider environment, as in block 510. The request may be for an ML model to be downloaded and run locally at a computing hub in a local network.

A plurality of candidate ML models may be generated at the ML model reduction service for the computing hub, as in block 520. The plurality of candidate ML models may be derived from a primary ML model in the service provider environment. The primary ML model may be associated with a set of tunable parameters and a candidate ML model in the plurality of candidate ML models may be associated with a subset of the tunable parameters associated with the primary ML model.

The plurality of candidate ML models may be run against validation data (or test data) in the service provider environment to evaluate performance criteria for the candidate ML models, as in block 530. The validation data may be associated with the customer account, and usage of the validation data may be authorized by a customer associated with the customer account. The performance criteria used to evaluate the candidate ML models may be received from the customer.

A performance representation of the candidate ML models with respect to the performance results for the candidate ML models may be provided from the ML model reduction service, as in block 540. The performance representation may be provided for display via a customer computing device associated with the customer. In addition, candidate ML models that do not satisfy a relative threshold in relation to the performance criteria as indicated in the performance results may be filtered from the performance representation.

A selection of an ML model from the performance representation of the candidate ML models may be received at the ML model reduction service, as in block 550. The selection of the ML model may be received from the customer computing device associated with the customer. The ML model may be selected based on the performance criteria of the ML model, as indicated in the performance representation.

The ML model selected from the performance representation may be provided from the ML model reduction service for download and execution on the computing hub in the local network, as in block 560. The computing hub (or computing node) may serve as a distributed computing service, an access point, a wireless gateway, a router, a switch or a wireless access point to the internet. Therefore, the ML model that runs on the computing hub may analyze data that is received at the computing hub.

Figure 6:
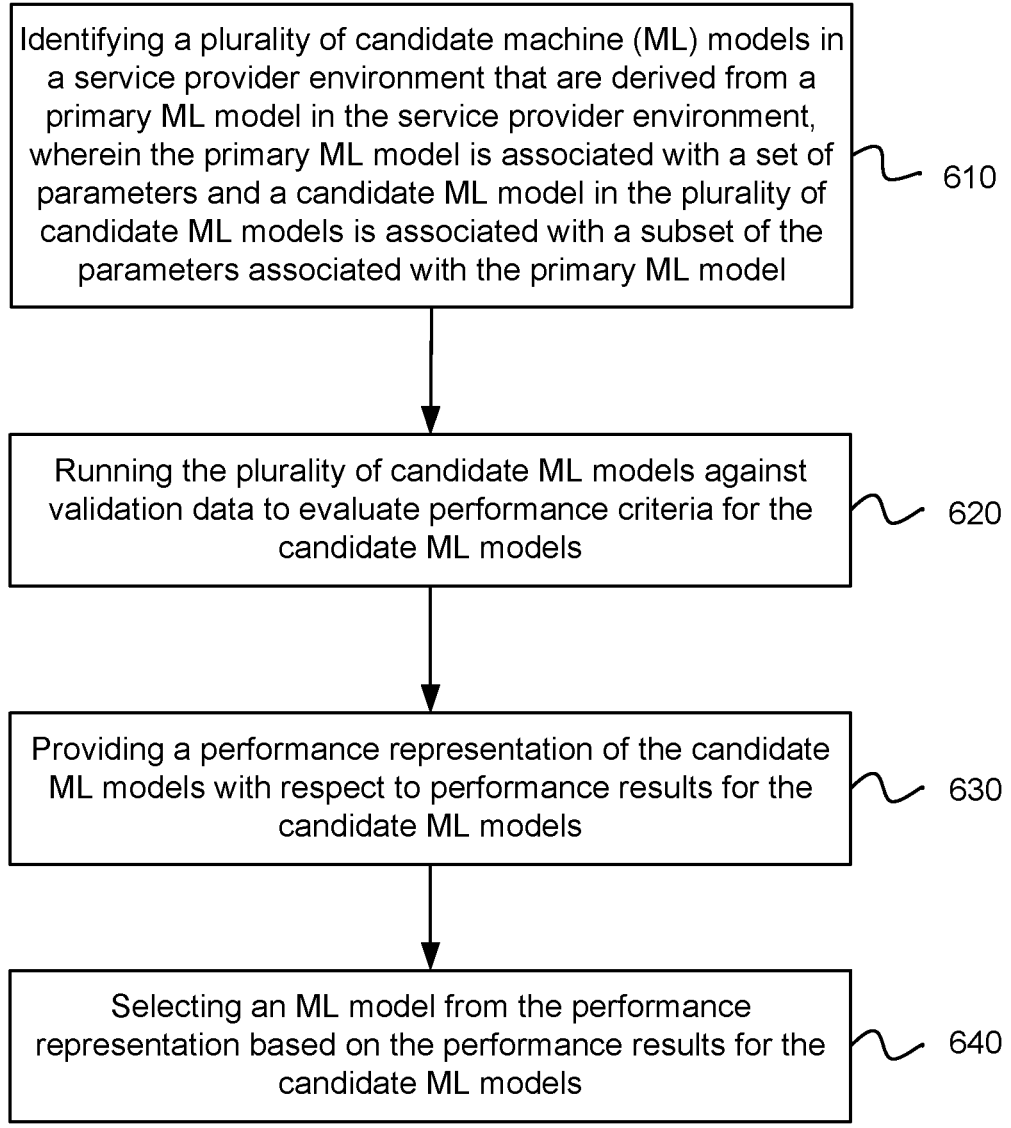
FIG. 6 is a flowchart of an example method for generating a machine learning (ML) model for a computing hub.

FIG. 6 illustrates an example of a method for generating a machine learning (ML) model. A plurality of candidate ML models that are derived from a primary ML model may be identified in a service provider environment, as in block 610. The primary ML model may be associated with a set of parameters and a candidate ML model in the plurality of candidate ML models may be associated with a subset of the parameters associated with the primary ML model.

The plurality of candidate ML models may be run against validation data (or test data) to evaluate performance criteria for the candidate ML models, as in block 620. The validation data may be associated with the customer account. In addition, the performance criteria may include an accuracy level of the candidate ML models, a processing speed or processing time of the candidate ML models and/or a model size of the candidate ML models.

A performance representation of the candidate ML models with respect to the performance criteria for the candidate ML models may be provided, as in block 630. The performance representation of the candidate ML models may filter or remove candidate ML models that do not satisfy a relative threshold for the performance criteria.

A selection of an ML model from the performance representation of the candidate ML models may be received, as in block 640. For example, the selection of the ML model may be received from the customer computing device. The ML model may be selected based on the performance criteria of the ML model. The ML model that is selected from the performance representation may be provided to a computing hub in a local network.

Figure 7:
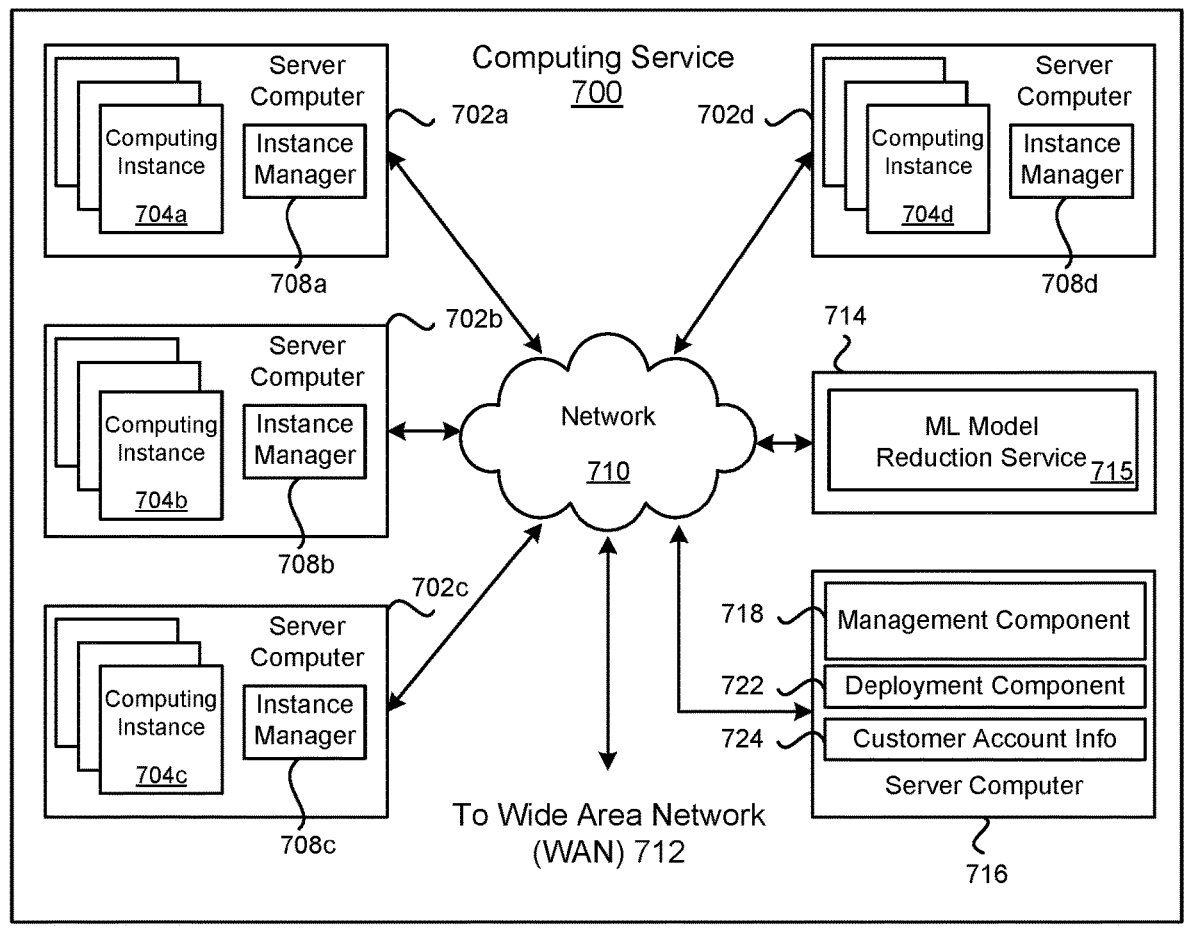
FIG. 7 is a block diagram of a service provider environment according to an example of the present technology.

FIG. 7 is a block diagram illustrating an example computing service 700 that may be used to execute and manage a number of computing instances 704*a-d* upon which the present technology may execute. In particular, the computing service 700 depicted illustrates one environment in which the technology described herein may be used. The computing service 700 may be one type of environment that includes various virtualized service resources that may be used, for instance, to host computing instances 704*a-d*.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702*a-d*. The server computers 702*a-d* may also be known as physical hosts. While four server computers are shown, any number may be used, and large data centers may include thousands of server computers. The computing service 700 may provide computing resources for executing computing instances 704*a-d*. Computing instances 704*a-d* may, for example, be virtual machines. A virtual machine may be an instance of a software implementation of a machine (i.e. a computer) that executes applications like a physical machine. In the example of a virtual machine, each of the server computers 702*a-d* may be configured to execute an instance manager 708*a-d* capable of executing the instances. The instance manager 708*a-d* may be a hypervisor, virtual machine manager (VMM), or another type of program configured to enable the execution of multiple computing instances 704*a-d* on a single server. Additionally, each of the computing instances 704*a-d* may be configured to execute one or more applications.

A server 714 may be reserved to execute software components for implementing the present technology or managing the operation of the computing service 700 and the computing instances 704*a-d*. For example, the server 714 may execute a machine learning (ML) model reduction service 715 operable to receive a request for an ML model for a computing hub in a local network. The ML model reduction service 715 may generate a plurality of candidate ML models for the computing hub that are derived from a primary ML model. The primary ML model may be associated with a set of tunable parameters and a candidate ML model in the plurality of candidate ML models may be associated with a subset of the tunable parameters associated with the primary ML model. The ML model reduction service 715 may run the plurality of candidate ML models against validation data in the computing service 700 to evaluate performance criteria for the candidate ML models. The ML model reduction service 715 may provide a performance representation of the candidate ML models with respect to performance results for the candidate ML models. Candidate ML models that do not satisfy a relative threshold in relation to the performance criteria as indicated in the performance results may be filtered from the performance representation. The ML model reduction service 715 may receive a selection of an ML model from the performance representation of the candidate ML models. The ML model reduction service 715 may provide the ML model selected from the performance representation to the computing hub in the local network.

A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache is to be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end customers may access the computing service 700. In addition, the network 710 may include a virtual network overlaid on the physical network to provide communications between the servers 702*a-d*. The network topology illustrated in FIG. 7 has been simplified, as many more networks and networking devices may be utilized to interconnect the various computing systems disclosed herein.

Figure 8:
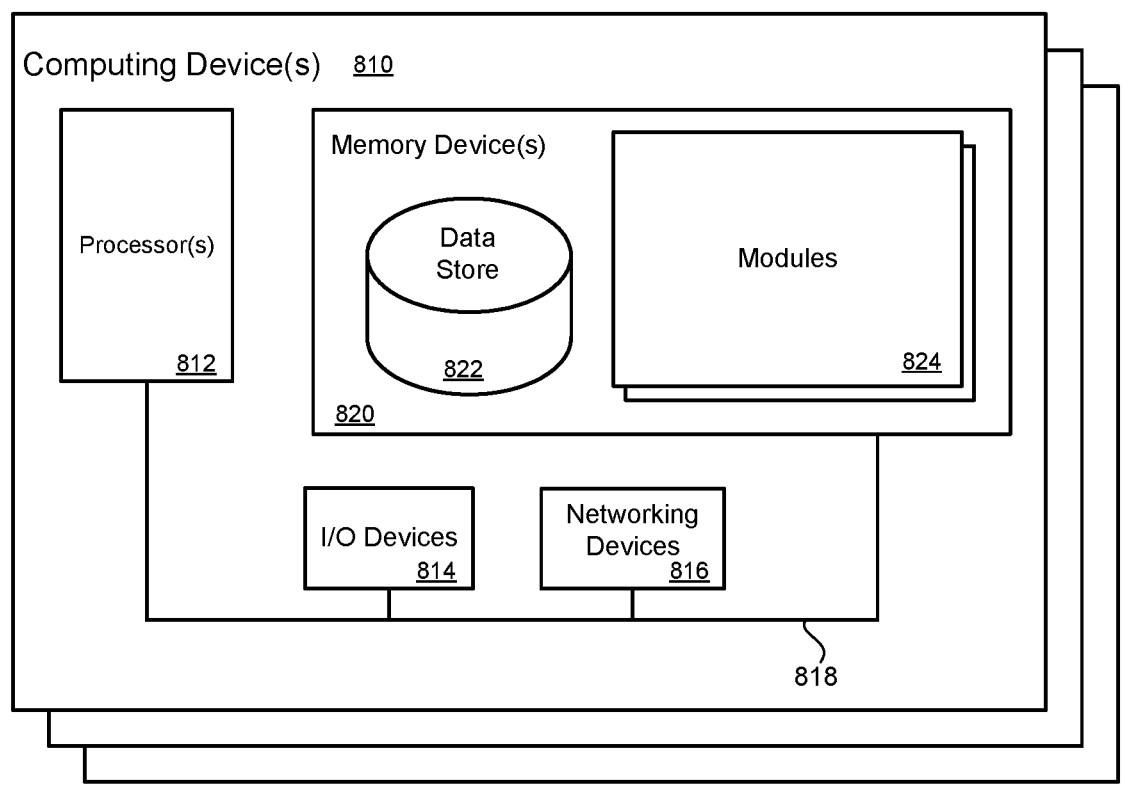
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by one or more processors, comprising:
    receiving, at a machine learning (ML) model reduction service that operates in a service provider environment, a request for an ML model for a computing hub;
    generating, at the ML model reduction service, a plurality of candidate ML models for the computing hub that are derived from a primary ML model in the service provider environment, wherein the primary ML model is associated with a set of tunable parameters and a candidate ML model in the plurality of candidate ML models is associated with a subset of the tunable parameters associated with the primary ML model;
    training the plurality of candidate ML models using training data;
    running the plurality of candidate ML models against validation data in the service provider environment to evaluate performance criteria for the candidate ML models;
    providing, from the ML model reduction service, a performance representation of the candidate ML models with respect to performance results for the candidate ML models;
    receiving, at the ML model reduction service, a selection of an ML model from the performance representation of the candidate ML models, wherein the selection of the ML model is based at least in part on the accuracy of the ML model running on hardware with capabilities that correspond with those of the computing hub; and
    providing, from the ML model reduction service, the ML model selected from the performance representation to the computing hub.

2. The non-transitory machine readable storage medium of claim 1, further comprising: selecting a separate subset of tunable parameters for each candidate ML model in the plurality of candidate ML models from the set of tunable parameters associated with the primary ML model in the service provider environment, wherein the subset of tunable parameters that is selected is a permutation of tunable parameters included in the set of tunable parameters for the primary ML model.

3. The non-transitory machine readable storage medium of claim 1, further comprising: selecting the subset of tunable parameters for the candidate ML model based on an evolutionary selection process or a simulated annealing technique.

4. The non-transitory machine readable storage medium of claim 1, further comprising: selecting the subset of tunable parameters for the candidate ML model based on patterns of previously used subsets of tunable parameters for related types of candidate ML models that have been previously run by the ML model reduction service in the service provider environment.

5. A method, comprising:
    identifying a plurality of candidate machine learning (ML) models in a service provider environment that are derived from a primary ML model in the service provider environment, wherein the primary ML model is associated with a set of parameters and a candidate ML model in the plurality of candidate ML models is associated with a subset of the parameters associated with the primary ML model;
    training the plurality of candidate ML models using training data;
    running the plurality of candidate ML models against validation data to evaluate performance criteria for the candidate ML models;
    providing a performance representation of the candidate ML models with respect to performance results for the candidate ML models; and
    selecting an ML model from the performance representation based on the performance results for the candidate ML models running on hardware with capabilities that correspond with those of a computing hub.

6. The method of claim 5, further comprising providing the ML model selected from the performance representation for download and execution on a computing hub in a local network.

7. The method of claim 5, further comprising selecting a separate subset of parameters for each candidate ML model in the plurality of candidate ML models from the set of parameters associated with the primary ML model in the service provider environment, wherein the subset of parameters that is selected is a permutation of parameters included in the set of parameters for the primary ML model.

8. The method of claim 5, further comprising selecting the subset of parameters for the candidate ML model based on an evolutionary selection process or a simulated annealing technique.

9. The method of claim 5, further comprising selecting the subset of parameters for the candidate ML model based on patterns of previously used subsets of parameters for related types of candidate ML models that have been previously run in the service provider environment.

10. The method of claim 5, further comprising removing candidate ML models from the performance representation that do not satisfy a relative threshold as indicated in the performance results using a clustering technique, a neural network, supervised machine learning or regression.

11. The method of claim 5, further comprising:
    associating training data with a customer account, wherein the associating is based at least in part on customer information;
    training the plurality of candidate ML models using the training data associated with the customer account; and
    running the plurality of candidate ML models against the validation data that is associated with the customer account, wherein the training data and the validation data are authorized to be used by a customer associated with the customer account.

12. The method of claim 5, further comprising receiving the performance criteria for evaluation of the candidate ML models from a customer, wherein the performance criteria includes: an accuracy level of the candidate ML models, a processing speed of the candidate ML models, or a model size of the candidate ML models.

13. The method of claim 5, further comprising running the plurality of candidate ML models on a type of hardware in the service provider environment that has a capability corresponding to a computing hub in a local network that is to run the ML model selected from the performance representation.

14. The method of claim 5, further comprising deleting the candidate ML models from the service provider environment after receiving a selection of the ML model.

15. The method of claim 5, wherein the ML model that is selected from the performance representation of the candidate ML models is compatible with a hardware and memory specification of a computing hub in a local network that runs the ML model selected from the performance representation.

16. The method of claim 5, wherein the primary ML model is not compatible with a hardware and memory specification of a computing hub in a local network that runs the ML model selected from the performance representation.

17. A system, comprising:
at least one processor;
at least one memory device including a data store to store a plurality of data and instructions that, when executed, cause the system to:
receive a request for a machine learning (ML) model for a computing hub in a local network;
generate a plurality of candidate ML models in a service provider environment that are derived from a primary ML model in the service provider environment, wherein a candidate ML model in the plurality of candidate ML models is associated with a subset of parameters;
train the plurality of candidate ML models using training data;
run the plurality of candidate ML models against validation data in the service provider environment to evaluate performance criteria for the candidate ML models;
provide a performance representation of the candidate ML models with respect to performance results for the candidate ML models, wherein the selection of the ML model is based at least in part on the accuracy of the ML model running on hardware with capabilities that correspond with those of the computing hub;
receive a selection of an ML model from the performance representation of the candidate ML models; and
provide the ML model selected from the performance representation for download and execution on the computing hub in the local network.

18. The system of claim 17, wherein the plurality of data and instructions, when executed, cause the system to remove candidate ML models from the performance representation that do not satisfy a relative threshold as indicated in the performance results using a clustering technique, a neural network, supervised machine learning or regression.

19. The system of claim 17, wherein the plurality of data and instructions, when executed, cause the system to receive the performance criteria for evaluation of the candidate ML models from a customer, wherein the performance criteria includes: an accuracy level of the candidate ML models, a processing speed of the candidate ML models, or a model size of the candidate ML models.

20. The system of claim 17, wherein the plurality of data and instructions, when executed, cause the system to select a separate subset of parameters for each candidate ML model in the plurality of candidate ML models from a set of parameters associated with the primary ML model in the service provider environment.

* * * * *